(12) United States Patent
Amirahmadi et al.

(10) Patent No.: US 9,484,840 B2
(45) Date of Patent: Nov. 1, 2016

(54) HYBRID ZERO-VOLTAGE SWITCHING (ZVS) CONTROL FOR POWER INVERTERS

(71) Applicant: University of Central Florida Research Foundation, Inc., Orlando, FL (US)

(72) Inventors: Ahmadreza Amirahmadi, Orlando, FL (US); Haibing Hu, Orlando, FL (US); Issa Batarseh, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 121 days.

(21) Appl. No.: 14/471,961

(22) Filed: Aug. 28, 2014

(65) Prior Publication Data

US 2015/0062988 A1 Mar. 5, 2015

Related U.S. Application Data

(60) Provisional application No. 61/870,999, filed on Aug. 28, 2013.

(51) Int. Cl.
*H02M 7/5383* (2007.01)
*H02M 7/5387* (2007.01)
*H02M 1/08* (2006.01)
*H02M 1/00* (2006.01)

(52) U.S. Cl.
CPC ......... *H02M 7/53873* (2013.01); *H02M 1/083* (2013.01); *H02M 2001/0058* (2013.01); *Y02B 70/1491* (2013.01)

(58) Field of Classification Search
CPC ............... H02M 1/083; H02M 1/047; H02M 2001/0058; H02M 2001/0009; H02M 2007/53876; H02M 2007/53878; H02M 7/53873; H02M 7/53875; H02M 7/53876; Y02B 70/1491

See application file for complete search history.

(56) References Cited

U.S. PATENT DOCUMENTS 6,671,188 B2 * 12/2003 Morita ............... H02M 1/34
  363/21.01
8,358,523 B2   1/2013 Schill
  (Continued)

FOREIGN PATENT DOCUMENTS

WO   WO2013104503   * 7/2013

OTHER PUBLICATIONS

B. Panda, et al., "Soft-Switching DC-AC Converters: A Brief Literature Review", International Journal of Engineering Science and Technology, vol. 2(12), 2010, pp. 7004-7020.

*Primary Examiner* — Timothy J Dole
*Assistant Examiner* — Shahzeb K Ahmad
(74) *Attorney, Agent, or Firm* — Jetter & Associates, P.A.

(57) ABSTRACT

A power inverter combination includes a half-bridge power inverter including first and second semiconductor power switches receiving input power having an intermediate node therebetween providing an inductor current through an inductor. A controller includes input comparison circuitry receiving the inductor current having outputs coupled to first inputs of pulse width modulation (PWM) generation circuitry, and a predictive control block having an output coupled to second inputs of the PWM generation circuitry. The predictive control block is coupled to receive a measure of Vin and an output voltage at a grid connection point. A memory stores a current control algorithm configured for resetting a PWM period for a switching signal applied to control nodes of the first and second power switch whenever the inductor current reaches a predetermined upper limit or a predetermined lower limit.

12 Claims, 3 Drawing Sheets

(56) References Cited

U.S. PATENT DOCUMENTS

| | | | |
|---|---|---|---|
| 2005/0281067 A1* | 12/2005 | Deng | H02M 7/53875 363/131 |
| 2007/0025130 A1* | 2/2007 | Hobraiche | H02M 7/53875 363/131 |
| 2007/0109822 A1* | 5/2007 | Kuan | H02M 3/1588 363/21.14 |
| 2009/0196082 A1* | 8/2009 | Mazumder | H02M 5/458 363/132 |
| 2015/0009732 A1* | 1/2015 | Turki | H02M 7/53871 363/97 |

* cited by examiner

HYBRID ZERO-VOLTAGE SWITCHING (ZVS) CONTROL FOR POWER INVERTERS

CROSS REFERENCE TO RELATED APPLICATIONS

This application claims the benefit of Provisional Application Ser. No. 61/870,999 entitled "SOFT SWITCHING CURRENT CONTROL FOR HIGH EFFICIENCY POWER INVERTERS", filed on Aug. 28, 2013, which is herein incorporated by reference in its entirety.

STATEMENT REGARDING FEDERALLY SPONSORED RESEARCH

This invention was made with U.S. Government support under Award Number DE-EE0003176 awarded by the U.S. Dept of Energy (DOE). The U.S. Government has certain rights in this invention.

FIELD

Disclosed embodiments relate to switching power inverters.

BACKGROUND

Three-phase power inverters change DC power received from DC power sources such as batteries, solar panels, or fuel cells, to AC power. Conventional power inverters generally utilize a hard switched or a soft switched topology.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize there are significant limitations with known methods for obtaining a high power conversion efficiency for a power inverter which generally comprises using a high switching frequency or the addition of resonant components and auxiliary devices. Instead, disclosed embodiments raise the power efficiency using a new hybrid current control technique and implementing switched power inverter combination (with controller) for a zero-voltage switching (ZVS) inverter operation referred to herein as "hybrid ZVS current control".

Since the soft switching condition for the power switches of the conventional half-bridge three-phase topology is created by disclosed hybrid ZVS current control, no additional devices or magnetic components (inductors or transformers) are needed. The device count is thus the same as a conventional Voltage Source Inverter or Variable Source Inverter (VSI inverter). Disclosed hybrid ZVS current control also allows for relatively easy implementation by a processor having an associated memory such as a digital signal processor (DSP), microcontroller unit (MCU) or an application specific integrated circuit (ASIC), and thus eliminates the need for external analog components, thus increasing the power density.

BRIEF DESCRIPTION OF THE DRAWINGS

FIG. 1 is a depiction of a standard half-bridge three-phase power inverter that disclosed hybrid ZVS current control may be implemented with.

DETAILED DESCRIPTION

Figure 1:
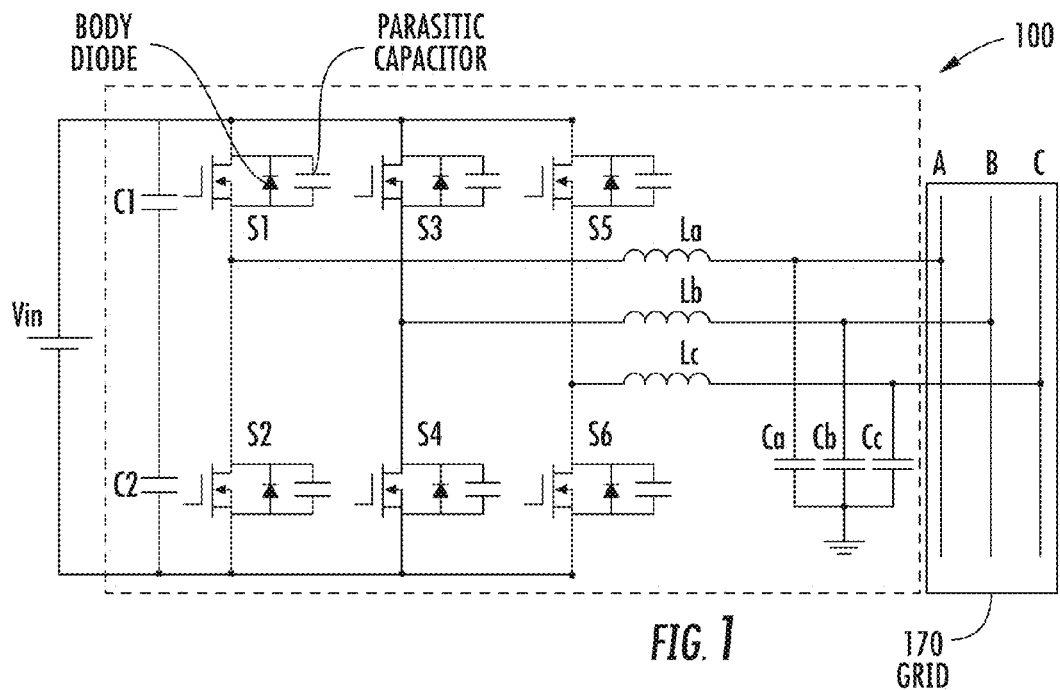

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

A conventional half-bridge three phase power inverter (power inverter) 100 is shown in FIG. 1 that disclosed hybrid ZVS current control may be implemented with. Disclosed embodiments may be applied to single phase power inverters as well, and with other configurations such as a full bridge, or power inverters including a transformer.

Although the power inverter 100 is shown with all the semiconductor power switches (power switches) $S_1$-$S_6$ being n-channel metal oxide semiconductor field effect transistors (NMOS) power switches, as used herein, the term "semiconductor power switches" includes MOS and other field effect transistors (FETs), bipolar junction transistors (BJTs) and Insulated Gate Bipolar Transistor (IGBTs). When a parasitic diode and a parasitic capacitor are not provided by the power switch, an external diode and capacitor in parallel may be added across the power switch. As known in the art of power semiconductors, FETs and IGBTs have gates as their control input, while BJTs have a base as their control input. Thus, although the specific semiconductor switches shown herein are all generally MOS switches, it is understood the semiconductor power switches can generally be any type of semiconductor power switch.

Figure 4:
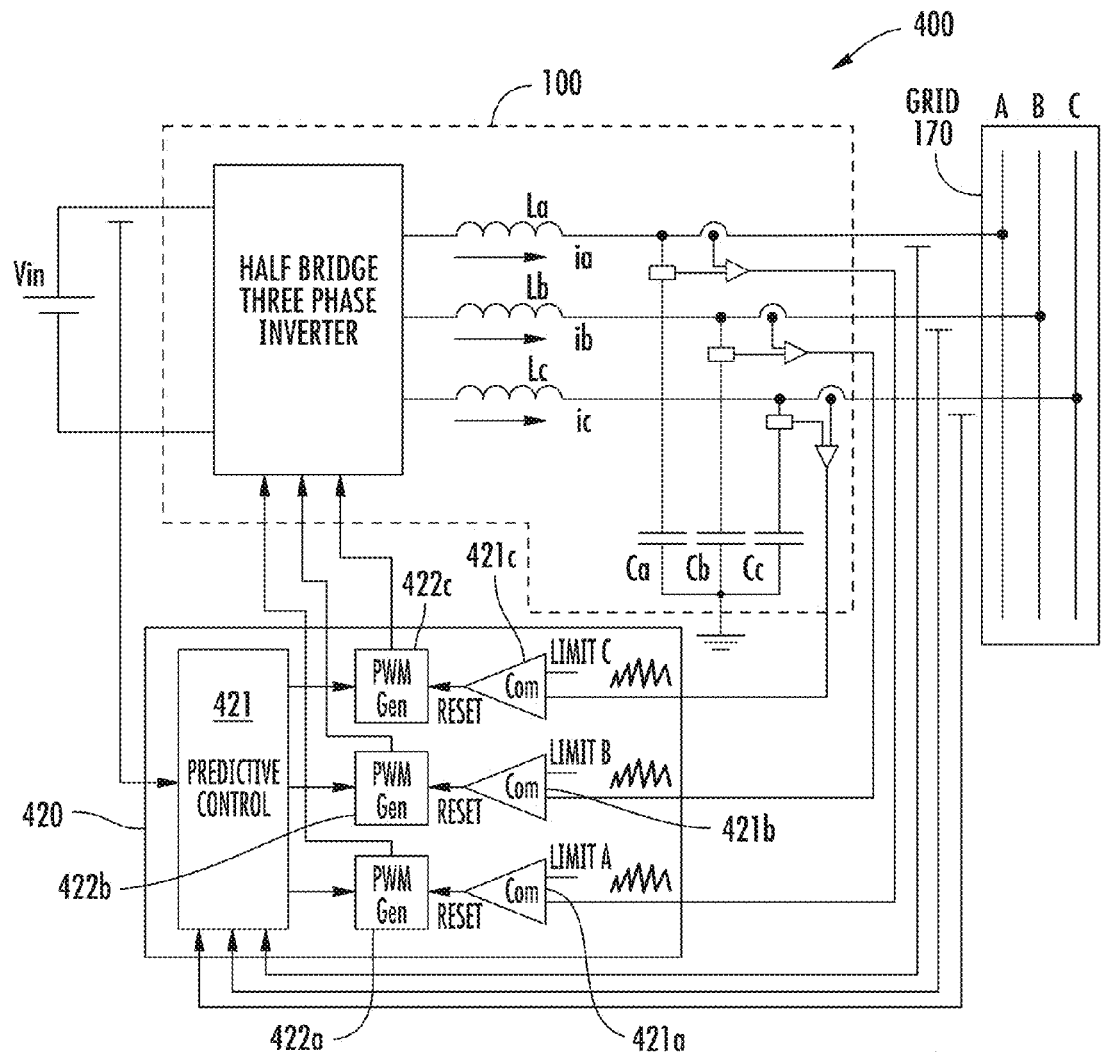
FIG. 4 shows an example switched power inverter system including the power inverter shown in FIG. 1 and a digital signal processor (DSP) implementing disclosed hybrid ZVS current control for the power inverter, according to an example embodiment.

The MOS power switches disclosed herein can all generally be either NMOS or PMOS devices, or a combination of NMOS and PMOS, provided an appropriate driving (firing) circuit provides the appropriate gate bias. Although the gates of the power switches $S_1$-$S_6$ are shown floating in FIG. 1, the output from a disclosed controller (see DSP or MCU 420 in FIG. 4 described below) provides a multichannel external control node (e.g., gate) driver which provides the control voltages (pulse width modulation (PWM) signals) for driving the control nodes (e.g., gates) of each power switch $S_1$-$S_6$ to provide the switching behavior described herein (such as shown in FIG. 4 described below).

Each of the three phases (A, B and C) of the power inverter 100 includes series connected first and second power switches which have an intermediate node between the first and second semiconductor power switches which provide an inductor current that drives circuitry comprising an inductor (La, Lb and Lc) in series with an output capacitor (Ca, Cb, and Cc) to ground to provide a low pass filter output to the grid 170 having grid phases A, B and C, where the respective connections to the grid 170 shown are taken across the output capacitors. The DC power input to the power inverter 100 is shown as Vin, which can be from a solar power source, fuel cell or a battery. Disclosed embodiments are applicable to other power sources including wind sources and tidal sources.

In this topology there are parasitic diodes and capacitors shown electrically in parallel with the source to drain direction of the power switches $S_1$-$S_6$, which are the body diodes and parasitic output (junction) capacitors of the power switches $S_1$-$S_6$. The body diodes allow a current path to enable bi-directional current operation. Disclosed hybrid ZVS current control is generally described herein implemented for this topology having MOS power switches. Hybrid ZVS current control is achieved by allowing bi-directional current flow which discharges the power switches' $S_1$-$S_6$ parasitic output capacitor with discharge current that passes through the body diode prior to each switching transition. Implementation of disclosed hybrid ZVS current control methods involve setting upper and lower boundaries (upper and lower limits) for the inductor current (shown in FIG. 4 as ia, ib and is for a 3 phase power converter) which flows through La, Lb and Lc respectively. This control is conventionally referred to as Peak Current Control. Peak Current Control is conventionally implemented using analog circuitry configured to apply appropriate control node (e.g., gate) PWM drive signals to turn ON and OFF the respective power switches $S_1$-$S_6$ when the inductor current reaches the expected low and high limits, respectively reflected in lower and upper limits for the inductor current. Such analog circuits are recognized have the problem of reliability and they also decrease the power density of the power inverter. Analog circuits are generally bulky, which decreases inverter power density.

Another known method to implement peak current control is to predict the required switching time for power switches $S_1$-$S_6$ (to turn ON and OFF) using a calculation inside a controller known as predictive control. The required $T_{ON}$ and $T_{OFF}$ for the respective power switches $S_1$-$S_6$ can be predicted in order to change the current between the desired inductor current boundaries (limits). A problem with this switching method is accumulated error caused by the change in parameters (e.g., for the inductors) of the power inverter.

Disclosed hybrid ZVS current control is a combination of hardware resetting and predictive control (see FIG. 2 described below). Hybrid ZVS current control does not need external components and can be fully implemented using features provided on commercially available processors such as DSPs or MCUs designed for power electronics applications. For example, DSPs or MCUs designed for power electronics applications besides a controller (processor) include comparator(s), current reset circuitry (for implementing a hardware reset of the pulse width modulation (PWM) module using the measured inductor current), high speed PWMs, and fault protection. By taking advantage of a comparison of the inductor current and a reference waveform by internal comparator(s) provided by DSPs (or MCUs) designed for power electronics applications, the period for the PWM switching signals applied to the control nodes of the power switches $S_1$-$S_6$ can be reset (a "hardware reset") whenever the inductor current reaches a predetermined boundary (limit). The duty cycle for the PWM switching signals can be predicted using calculation code stored inside an on-chip memory (e.g., read only memory (ROM)) associated with the DSP (or MCU).

Figure 2:
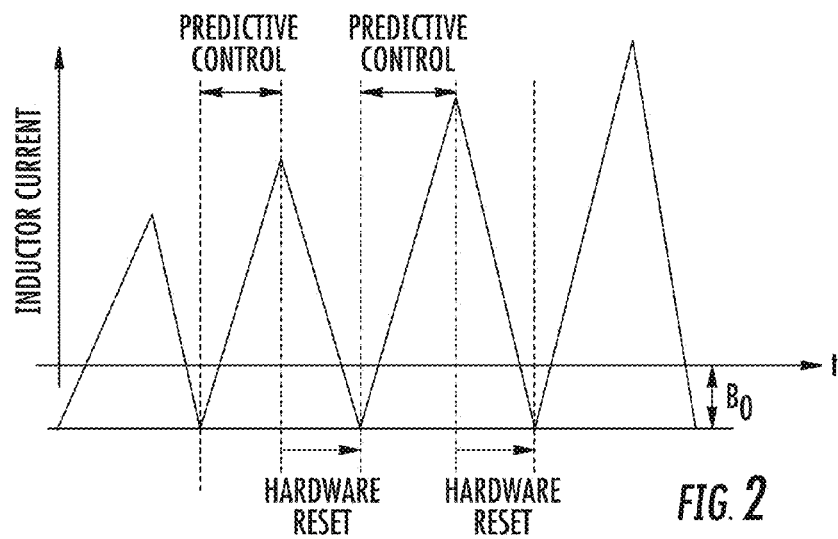
FIG. 2 shows an example inductor current vs time plot using a disclosed hybrid ZVS current control method for one phase of a power inverter, according to an example embodiment.

FIG. 2 shows an example depiction of inductor current as a function of time for a power inverter using a disclosed hybrid ZVS current control method for its phase or one of the phases, where the y-axis is inductor current and the x-axis is time. As shown, predictive control applies until the PWM period is reset (shown as a ("hardware reset")). A PWM period reset as used herein means a variable switching frequency (see the Examples below for how to set this frequency for metal-oxide semiconductor field-effect transistor (MOSFET) switches), with a hardware reset triggered whenever the inductor current reaches the predetermined high or low current boundary (limit)). $B_0$ shown in FIG. 2 is the lower current limit used to start predictive control.

In a practical implementation there is generally a difference between the value of the lower limit of the inductor current and the predetermined lower current limit due to time delays in the actual circuitry. Delays in the comparator, driver circuits, and switches, and non-ideality of the power switches is generally the main reason for this timing difference. In order to minimize the effect of this non-ideality on the output current waveform, a same-shape hardware reset for the positive half cycle and negative half cycle may be used. Therefore a lower current limit can be set as a hardware reset for positive half cycle, and for the negative half cycle the upper current limit is the hardware reset as shown in FIG. 3 described below.

Figure 3:
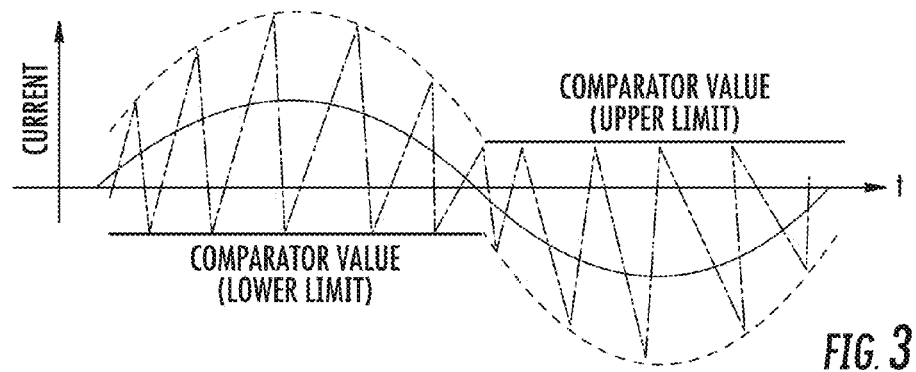
FIG. 3 is a depiction of inductor current vs time plot using an example hardware reset of the inductor current, according to an example embodiment.

A depiction of an example hardware reset of the inductor current (ia, ib or ic) is shown in FIG. 3 for both a positive half cycle and for a negative half cycle. The internally processor generated signal applied to an input of the comparators (shown as limit A, limit B, and limit C shown in FIG. 4 for the respective comparators 421a, 421b, 421c) is changed between a lower current limit (the Lower limit) and an upper current limit (the upper limit) according to the positive and negative half cycle of a reference current. The reference current shown as a sinusoid can also be internally generated by the controller, such as implemented by a DSP or MCU.

The PWM pulse train is applied to the control node of the power switches of the power inverter when the measured inductor current during the positive half cycle exceeds the lower limit. The PWM Period is reset when the current exceeds lower limit during the positive half cycle and when the current exceeds the upper limit during the negative half cycle.

A switched power inverter combination 400 including the half-bridge three phase power inverter 100 shown in FIG. 1 including a DSP or MCU 420 as the system controller implementing disclosed hybrid ZVS current control is shown in FIG. 4. For each phase only one comparator (421a, 421b, 421c) and one PWM generator (Gen) block (422a, 422b, 422c) are needed to produce the PWM switching signals for application to the control nodes (e.g., gates) of the power switches $S_1$ to $S_6$ to realize disclosed hybrid ZVS current control. The connection to the left of the power inverter 100 to the predictive control block 421 in the DSP or MCU 420 is for providing a measure of (sensing) of Vin to the predictive control block 421. Switching signals are shown from the PWM generation blocks 422a, 422b and 422c in the DSP or MCU 420 to the control nodes of the switches $S_1$-$S_6$ in the power inverter 100. Since all the controller components shown in FIG. 4 can be located inside a DSP or MCU chip for DSP or MCU 420, the propagation delay to the power inverter 100 can be short for disclosed hybrid ZVS current control.

Design Consideration:

When $S_1$ to $S_6$ comprise MOS switches, the time to fully discharge the energy stored in the MOS switches' parasitic capacitor charged to a voltage $V_{dc}$ having capacitance C (in parallel with its body diode) shown as $t_d$ can be calculated according to the equation (1), where $B_0$ is shown in FIG. 2:

$$t_d = 2CV_{dc}/B_0 \quad (1)$$

and for ZVS operation, the dead-time (td) between PWM pulses should generally be set to be more than the time duration ($t_d$). Turn-on time ($T_{on}$) is defined as the time required to keep the upper switches (S1, S3, and S5 shown in FIG. 1) of the respective phases of the power inverter ON and make the inductor current reach from the lower limit ($i_{lower}$) to the upper limit ($i_{upper}$) shown in FIG. 3. Ton can be calculated according to equation (2), where $V_{dc}$ is the DC voltage providing input power to power inverter (shown as Vin in FIG. 1 and FIG. 4), and Vo is the output voltage at the grid connection point sensed between the inductors La, Lb and Lc and the grid 170.

$$T_{on} = L \frac{i_{upper} - i_{lower}}{\frac{1}{2}V_{dc} - V_o} \quad (2)$$

Turn-off ($T_{off}$) time is defined as the needed time which the lower power switches (S2, S4 and S6 shown in FIG. 1) should stay ON to make the inductor current (ia, ib and ic) reach from the upper current limit to the lower current limit shown in FIG. 3. $T_{off}$ can be calculated according to the equation (3):

$$T_{off} = L \frac{i_{upper} - i_{lower}}{\frac{1}{2}V_{dc} + V_o} \quad (3)$$

The predictive control block 421 shown in FIG. 4 calculates the duty cycle for each switching cycle using equation (2) for the positive half cycle and equation (3) for the negative half cycle.

Figure 5:
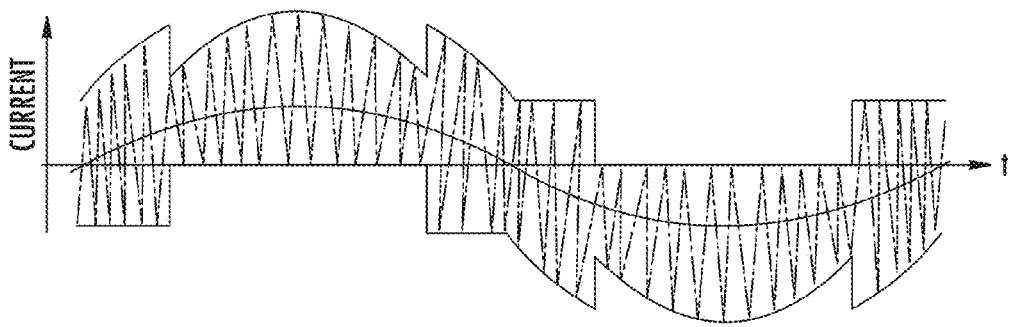
FIG. 5 depicts the inductor current waveform when dual-ZVS Zero Current Switching (ZCS) current modulation is used for a power inverter.

In another embodiment, in order to decrease the ohmic conduction ($I^2R$) losses of the power switches and improve the power efficiency of the power inverter even further, current modulation referred to herein as dual-ZVS Zero Current Switching (ZCS) that is depicted in FIG. 5 is used. Dual-ZVS ZCS is a new current control modulation scheme. Based on a loss analysis, a dual-mode current modulation method combining ZVS and ZCS schemes has been found to improve the efficiency of the power inverter (see FIG. 7 described below).

Figure 6A:
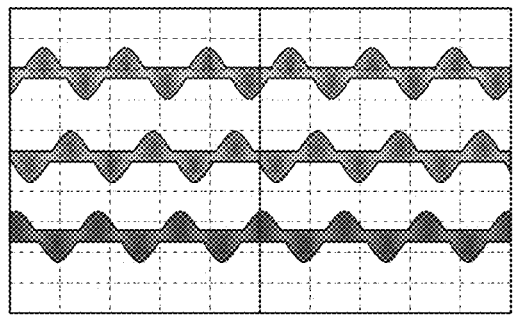
FIGS. 6A and 6B show the experimental inductor current waveforms for each of the phases of the three-phase power inverter using Boundary Conduction Mode (BCM) current modulation with fixed reverse current and dual-ZVS ZCS Current Modulation, respectively.
Figure 6B:
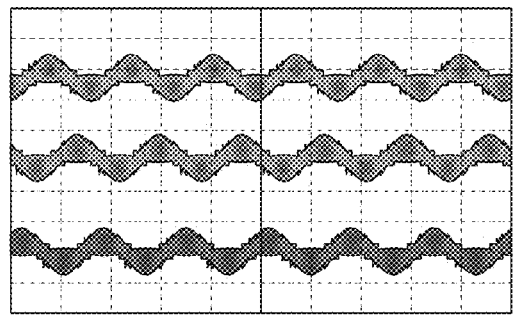

Dual-ZVS ZCS involves switching between ZVS operation and ZCS operation during each line half cycle. Using ZVS around the line zero crossing point reduces the switching frequency and switching losses. Using ZCS at the peak of the current during each line half cycle reduces the high-frequency RMS current thus reducing conduction losses. Dual-ZVS ZCS thus combines the ZVS and ZCS BCM current modulation schemes alternatively according to the different value of the current during each line half cycle so that the dominant losses can be reduced and higher efficiency is thus achieved. FIGS. 6A and 6B show experimental inductor current waveforms for each of the phases of the three-phase power inverter using BCM with fixed reverse current and BCM with Dual-ZVS ZCS Current Modulation, respectively.

EXAMPLES

Disclosed embodiments of the invention are further illustrated by the following specific Examples, which should not be construed as limiting the scope or content of this Disclosure in any way.

Figure 7:
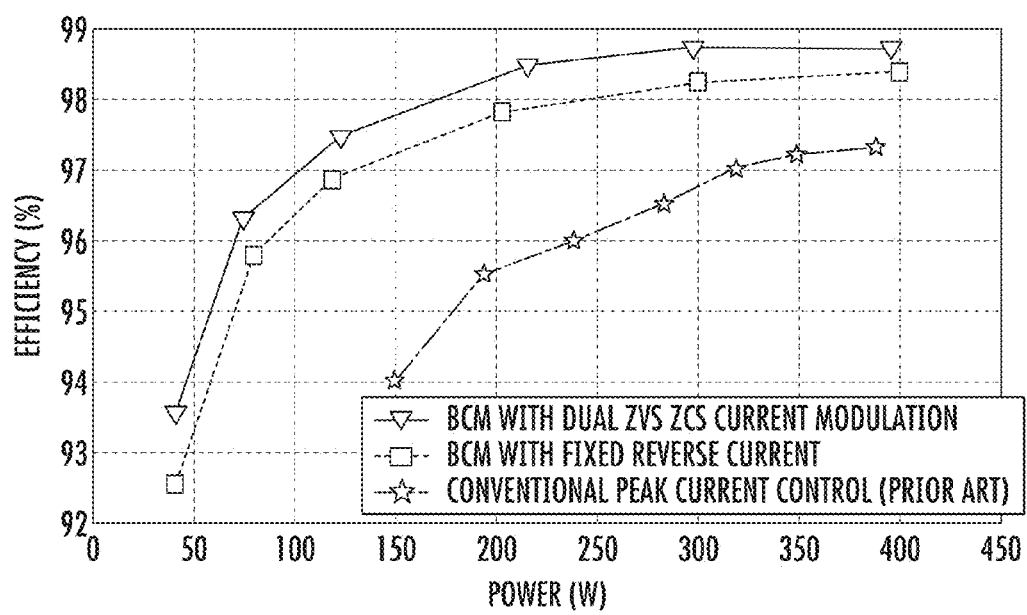
FIG. 7 shows experimental power efficiency curves for a 400 W power inverter using conventional peak current control, disclosed BCM with fixed reverse current, and dual-ZVS ZCS Current Modulation being shown. Disclosed dual-ZVS ZCS current modulation can be seen improve the power efficiency for the power inverter as compared to conventional peak current control and disclosed BCM with fixed reverse current.

The power efficiency curve for a 400 W power inverter using disclosed hybrid ZVS current control methodologies is shown in FIG. 7, with efficiency curves for disclosed BCM with fixed reverse current and Dual-ZVS ZCS current modulation shown, along with an efficiency curve using conventional peak current control. Disclosed dual-ZVS ZCS current modulation can be seen improve the power efficiency as compared to disclosed BCM with fixed reverse current and conventional peak current control. The peak inverter power efficiency using conventional peak current control is 97.3%, while the power inverter efficiency with disclosed BCM with fixed reverse current is seen to exhibit a peak power efficiency of about 98.4%, with disclosed Dual ZVS ZCS current modulation providing an even higher power efficiency of about 98.6%.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A power inverter combination, comprising:
a half-bridge power inverter (power inverter) comprising at least one phase including a series connected first and second semiconductor power switch configured for receiving input power (Vin) from a power source having an intermediate node between said first and second semiconductor power switch providing an inductor current through an inductor, and
a controller including input comparison circuitry receiving a measure of said inductor current having outputs coupled to first inputs of pulse width modulation (PWM) generation circuitry, and a predictive control block having an output coupled to second inputs of said PWM generation circuitry, wherein said predictive control block is coupled to receive a measure of a voltage provided by said Vin and of an output voltage at a grid connection point (Vo), and an associated memory which stores a current control algorithm configured for:
whenever said inductor current reaches a predetermined upper or lower limit, resetting a PWM period of a switching signal applied to a control node of said first semiconductor power switch and said second semiconductor power switch,
wherein a PWM pulse train is applied to said control node when said inductor current during a positive half cycle exceeds said predetermined lower limit, and said resetting said PWM period comprising resetting when said inductor current exceeds said predetermined lower limit during said positive half cycle and resetting when said inductor current exceeds said upper limit during a negative half cycle.

2. The power inverter combination of claim 1, wherein said phase comprises a first, a second and a third phase so that said power inverter comprises a three-phase inverter.

3. The power inverter combination of claim 1, wherein said controller is provided by a digital signal processor (DSP) chip or a microcontroller unit (MCU) chip and said input comparison circuitry comprises a comparator.

4. The power inverter combination of claim 1, wherein said first and second semiconductor power switches comprise first and second metal-oxide semiconductor field-effect transistor (MOSFET) switches.

5. The power inverter combination of claim 1, wherein said resetting of said PWM period of said switching signal utilizes a same shape waveform for both said positive half cycle and said negative half cycle.

6. The power inverter combination of claim 1, wherein said current control algorithm is further configured for implementing dual zero-voltage switching (ZVS) zero-voltage switching (ZCS) current modulation which switches said first semiconductor power switch and said second semiconductor power switch of said power inverter between ZVS operation and ZCS operation during each half cycle.

7. A method of operating a power inverter, comprising:
providing a half bridge power inverter (power inverter) comprising at least one phase including a series connected first and second semiconductor power switch configured for receiving input power (Vin) from a power source having an intermediate node between said first and second semiconductor power switch providing an inductor current through an inductor, and
using a controller including input comparison circuitry receiving said inductor current from said phase having outputs coupled to first inputs of pulse width modulation (PWM) generation circuitry, and a predictive control block having an output coupled to second inputs of said PWM generation circuitry, wherein said predictive control block is coupled to receive a measure of a voltage provided by said Vin and of an output voltage at a grid connection point (Vo), and an associated memory which stores a current control algorithm configured for:
whenever said inductor current reaches a predetermined upper limit or a predetermined lower limit, resetting a PWM period of a switching signal coupled to control nodes of said first and second semiconductor power switches, and
wherein a PWM pulse train is applied to said control nodes when said inductor current during a positive half cycle exceeds said predetermined lower limit, and said resetting said PWM period comprising resetting when said inductor current exceeds said predetermined lower limit during said positive half cycle and resetting when said inductor current exceeds said upper limit during a negative half cycle.

8. The method of claim 7, wherein said phase comprises a first, a second and a third phase so that said power inverter comprises a three-phase inverter.

9. The method of claim 7, wherein said first and second semiconductor power switches comprise first and second metal-oxide semiconductor field-effect transistor (MOSFET) switches.

10. The method of claim 7, wherein said resetting of said PWM period of said switching signal utilizes a same shape waveform for both said positive half cycle and said negative half cycle.

11. The method of claim 7, wherein said current control algorithm is further configured for implementing dual zero-voltage switching (ZVS) zero-voltage switching (ZCS) Current Modulation which switches said first semiconductor power switch and said second semiconductor power switch of said power inverter between ZVS operation and ZCS operation during each half cycle.

12. The method of claim 7, wherein said PWM period of said switching signal is reset whenever said inductor current reaches said predetermined upper limit and said predetermined lower limit.

* * * * *